Figure 1:
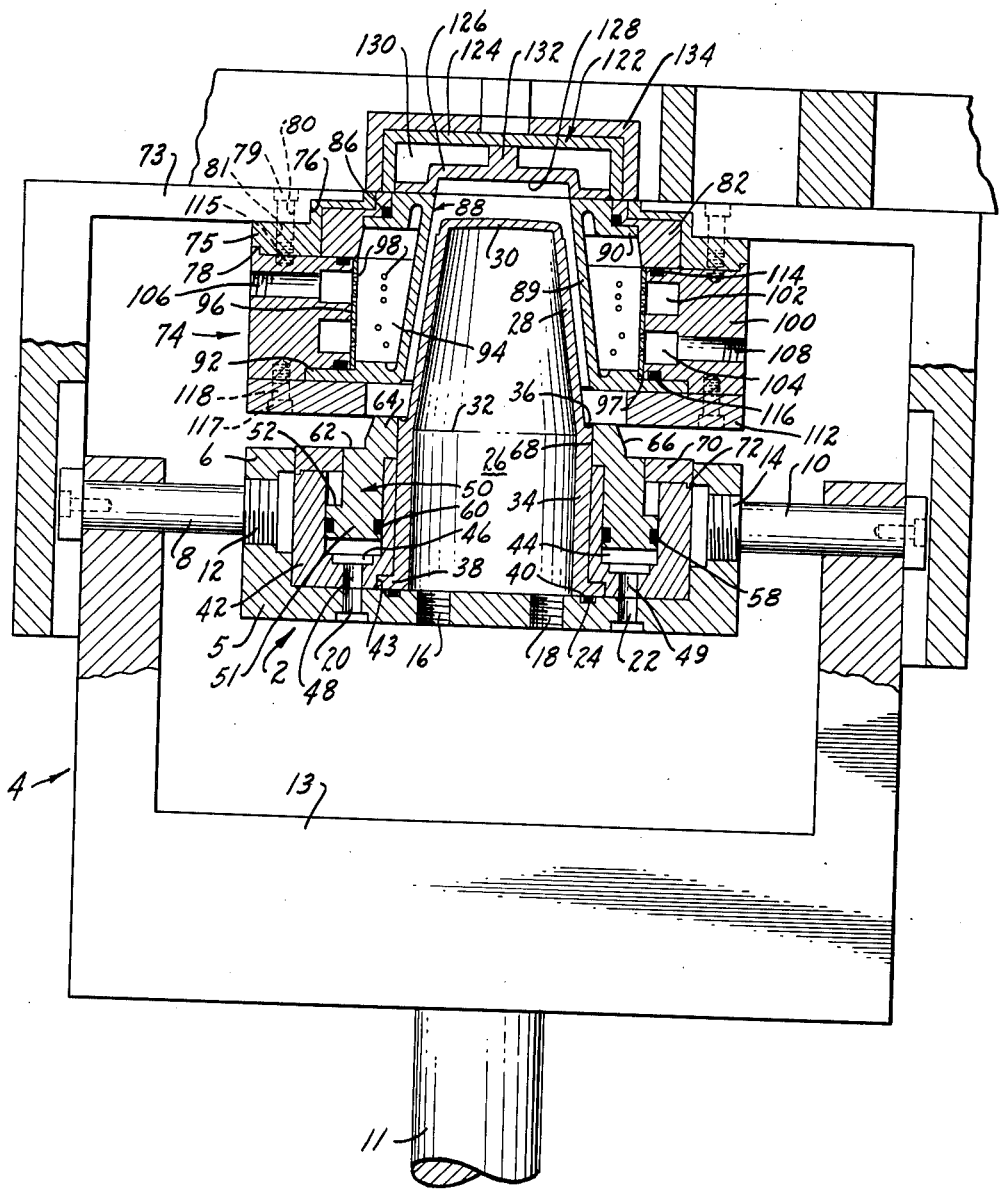

Aug. 10, 1965

J. M. HARRISON 3,200,175

METHOD OF MAKING CUPS

Filed June 17, 1960

3 Sheets-Sheet 1

INVENTOR.
James M. Harrison,
BY Parker & Carter
Attorneys.

Aug. 10, 1965        J. M. HARRISON        3,200,175
METHOD OF MAKING CUPS
Filed June 17, 1960                    3 Sheets-Sheet 3

INVENTOR.
James M. Harrison,
BY Parker & Carter
Attorneys.

3,200,175
METHOD OF MAKING CUPS

James M. Harrison, Fort Worth, Tex., assignor to Crown Machine & Tool Company, Fort Worth, Tex., a corporation of Texas
Filed June 17, 1960, Ser. No. 36,998
1 Claim. (Cl. 264—53)

This invention is in the field of plastic molding and is concerned with a method for molding thin-walled plastic containers.

It has been found that a foamable plastic may be used in the manufacture of plastic containers. It is utilized in bead form and might be polystyrene or the like. These plastic beads are charged or impregnated with a foaming agent such as methyl chloride, butane, or heptane or the like. When the beads are heated to a substantially high temperature, for example 230–240° F., the gases formed by the impregnating substance cause the individual beads to expand in balloon-like fashion to many times their original size.

At the outset, the raw beads vary in size from in the neighborhood of .050 to .060 inch in diameter all the way down to sizes difficult to measure. The practice is to apply an intermediate temperature to the beads prior to charging the mold with them. This temperature is substantially less than 230–240° F. temperature and may be in the neighborhood of 190° F. so that the beads will first only partially expand. The operation is referred to as pre-foaming and expands each bead in proportion to its original diameter.

Pre-foaming is required to insure proper charge distribution of the plastic in the mold cavity. A completely un-prefoamed charge, for example, will fill only a small percentage of the cavity and will expand insufficiently in restricted quarters to fill the mold cavity. This results in the formation of only a segment of a container of relatively high density.

The mold might be charged with pre-foamed beads by what is termed the "demand feed" technique. In this operation the cavity is charged with whatever amount of beads are required to fill it. Gravity causes the beads to fill the cavity. In the alternative, a source of pressure differential might be connected to cavity such that beads are drawn into it.

After pre-foaming, the largest beads are normally about .060 inch in diameter. In order that the partially expanded beads might fill the mold cavity properly, in this case, a separation of in the neighborhood of .100 inch between the mold core and the cavity wall might be maintained. At any rate, a separation of approximately .040 inch greater than the maximum pre-foamed bead diameter should be used in most cases. Any lesser distance inhibits uniform filling of the mold cavity. A differential of on the order of .040 inch permits the semi-expanded beads to descend into the cavity from a charge carrier above the cavity by the action of gravity or by a pressure differential created in the cavity or by a combination of these two. The mold cavity is then closed or covered and the maximum foaming temperature is applied to the core and cavity walls causing the beads to further expand and fuse with each other to form an entirely integral plastic container having thin walls permeated by cells formed by expanding gases during the heating operation.

The commercial production of containers in the manner which has been described is subject to certain limitations, however. A relatively high quality raw material must be used. Plastic beads in bulk form must be of a quality which is much higher than those required by other industries using the same raw material. A correlative higher price is the result.

Pre-foamed plastic beads for use in this particular molding operation cannot be stored long. After as little as 24 hours, their ultimate foaming characteristics are impaired such that the beads are insufficiently expandable upon being subjected to the final foaming operation to properly fill the mold cavity such that a satisfactory cup is obtained.

Since the walls are on the order of .100 inch thick, the finished cups are unsuitable for use in automatic vending equipment because in nested relationship an insufficient number can be stacked in the limited space. This is also important in bulk shipping.

Accordingly, a primary object of this invention is a novel method of manufacturing plastic containers.

Another object is a novel method of molding plastic containers wherein the walls of the containers are compressed right in the mold cavity.

Another object is a machine for performing the method.

Another object is a method for manufacturing thin-walled cups from pre-foamed plastic beads.

Another object is a method of manufacturing thin-walled cups from inexpensive, low grade raw plastic beads.

Another object is a method which is productive of containers of uniform weight.

Another object is a method for manufacturing thin-walled plastic containers wherein a metered charge of pre-foamed plastic beads is used to produce containers of uniform weight.

Another object is a method for manufacturing plastic cups having walls sufficiently thin to be advantageously employed in automatic vending equipment.

Another object is a method for manufacturing thin-walled cups which are resilient and do not shatter when they are broken.

Another object is a method for manufacturing plastic cups of varying wall thickness.

These and other objects of this invention will appear in the following specification and claims wherein like reference numerals identify like parts throughout.

Figure 2:
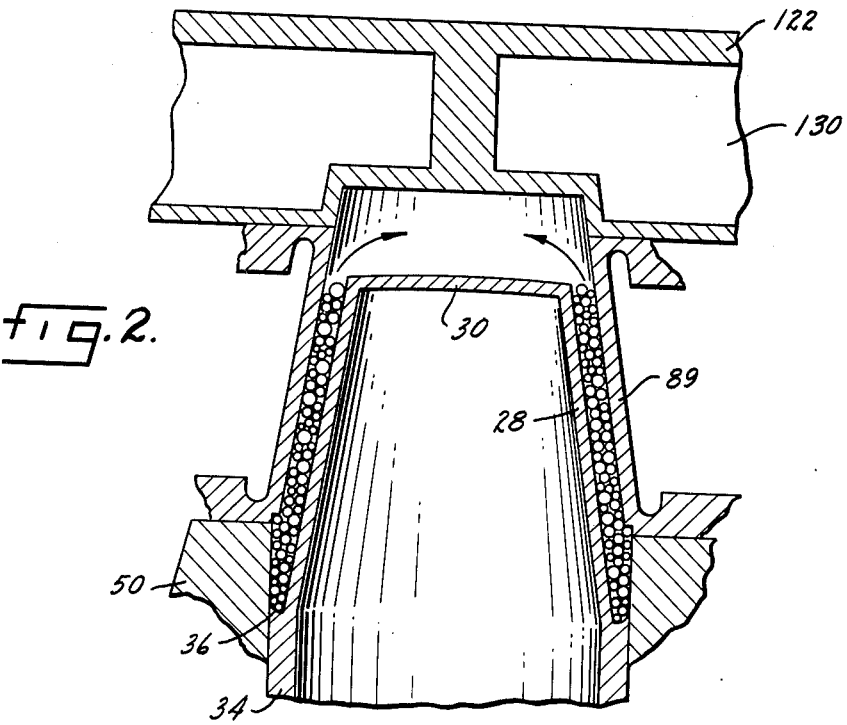
Figure 3:
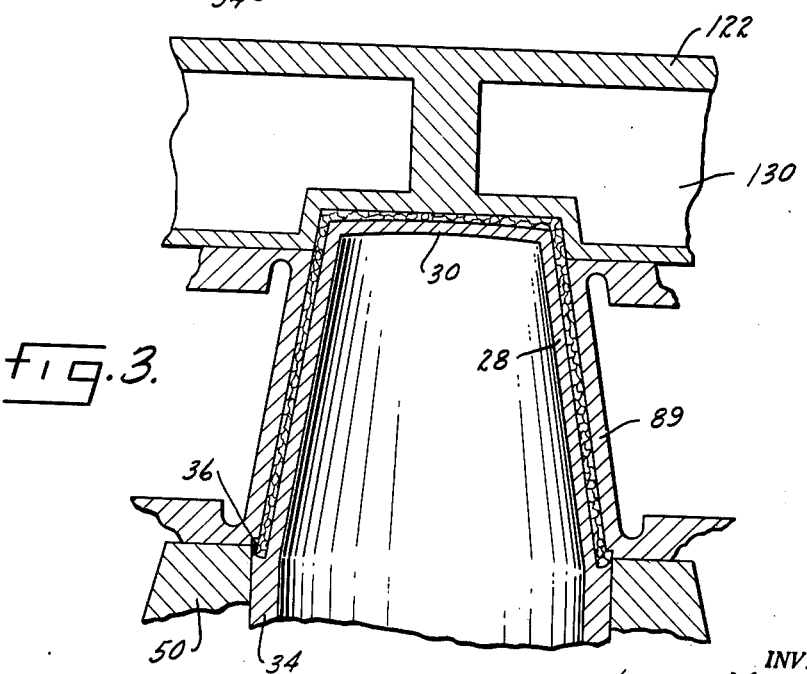
Figure 4:
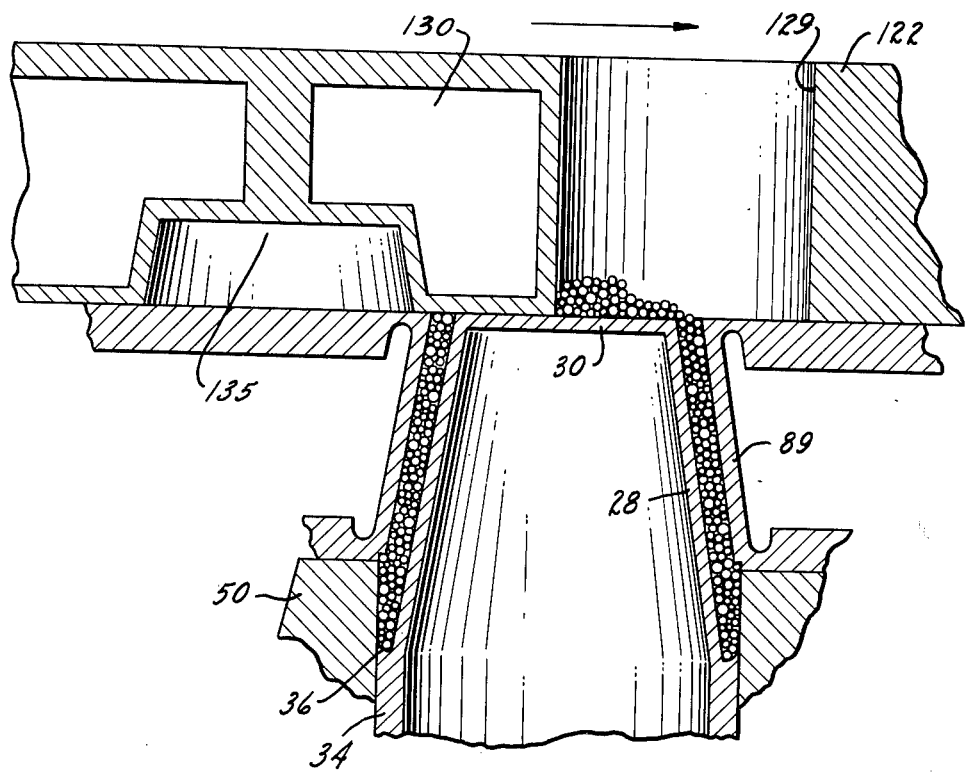

The invention is illustrated more or less diagrammatically in the following drawings wherein several variations are shown:

FIGURE 1 is a front elevation in section of a molding mechanism which may be utilized in practicing this method, FIGURE 2 is a diagrammatic view in detailed section of the mold cavity at the charging step in this method, FIGURE 3 is a view similar to FIGURE 2 at the molding stage, and FIGURE 4 is a view similar to that of FIGURES 2 and 3 and showing a variation on the charging method.

In FIGURE 1 is shown a suitable molding mechanism 2 which may vary extensively in detail from the precise showing and still carry out the basic molding operation. A frame 4, shown schematically, supports the molding mechanism.

The molding mechanism 2 is comprised of a mold core head 5 having a cup-like base 6. The base 6 is supported by arms 8 and 10 which are vertically slidable in the framework and may be raised and lowered by a conventional clamping air cylinder through piston rod 11 and yoke 13. In one possible variation on this invention, a double position clamping cylinder might be utilized. The arms 8 and 10 are threaded into opposite sides of the base 6 at 12 and 14, respectively. In the bottom of the base is a steam inlet port 16 and an outlet port 18. Fluid pressure ports 20 and 22 are shown as located in the bottom of the molding core base. An O-ring seat 24 is provided in the center of the upper side of base 6.

Seated on the upper side of the base over the O-ring seat is a mold core 26 in the general shape of an inverted cup. The core includes tapered wall 28 and a slightly convex cup bottom 30. Wall 28 is tapered at approximately 9° down to a point 32 where it forms an untapered or generally cylindrical wall 34. It will be understood, however, that the degree of taper might be varied to suit the configuration of the container desired. This lower wall 34 is thicker than the tapered wall 28 and has an annular lip 36 on its outer surface adjacent the junction 32 of walls 28 and 34. The base of wall 34 is flanged, as at 38. Seated in seat 24 is an O-ring 40 to provide a fluid seal between the base 6 and the wall 34.

Snugly seated within the upstanding sides of base 6 and surrounding wall 34 is a stand-off ring seat 42. Seat 42 is recessed at 43 to overlie flange 38. An annularly disposed continuous well 44 extends downwardly into the seat 42 and has a recessed base 46 contiguous therewith. The well 44 is connected by ports 48 and 49 to conventional fluid ports 20 and 22.

A stand-off ring 50 having a piston 51 at its base is seated in the well. A ledge 52 is formed above piston 51. Annularly disposed below the ledge 52 in recesses in the inner and outer faces of piston 51 are O-rings 58 and 60 The O-rings provide a fluid seal between the well and the piston. Above the ledge 52 the ring 50 extends outwardly of the well 44. A stand-off surface or ledge 62 is formed on the top of the ring 50 above which extends an inwardly protruding cage 64 having a beveled annular outer surface 66 and a cylindrical inner surface 68.

A ring seat retaining ring 70 having a locking lip 72 is seated above the ring seat 42 and extends over the ledge 52 to act as a piston limit stop.

Suspended from a plate 73 forming the top of the framework 4 is a mold cavity element shown generally at 74. The cavity element includes circular plate 75. Plate 75 is irregular in cross-section and is seated in a correspondingly irregular recess 76 in plate 73. An annular notch 78 extends around its outer periphery. A series of bolts 79 extend through holes 80 in plate 73 and holes 81 in plate 75. Seated within the ring 75 is a sealing ring 82 irregularly shaped to correspond with plate 75. Recessed on the inner periphery ring 82 is an annular notch having an O-ring 86 retained therein.

The outer shell of the mold cavity is formed by a flanged shell 88. The shell 88 has a cavity wall 89 and is open at the top and bottom. Wall 89 is tapered at approximately 9° to correspond to core wall 28. Flanges 90 and 92 extend outwardly from the top and bottom of the cavity wall 89 to form a channel 94. The flange 90 seats in sealed engagement with O-ring 86.

Forming an outer wall for channel 94 to create a steam passage around the cavity wall 89 is circular plate 96. Plate 96 is seated against an annular lip 97 on flange 92 and extends into engagement with sealing ring 82. Perforations 98 are provided in plate 96 around its circumference. The perforations provide an access for steam to enter and depart the passage formed by the channel 94.

Surrounding the plate 96 in close relationship with ring 82 and flange 92 is a circular body member 100. Member 100 has annular recesses 102 and 104 in its inner periphery adjacent the holes 98. Recess 102 is connected to a steam inlet port 106 and recesses 104 is connected to a steam outlet port 108. The ports 106 and 108 are connected in a conventional manner to a steam source (not shown). Recesses in the top and bottom of the body member have O-rings 114 and 116 seated therein maintaining a fluid tight seal with ring 82 and flange 92 respectively. The bolts 79 extend through ring 75 and into threaded engagement with member 100 at 115 to secure the body member to plate 73.

The flanged cavity forming shell 88 is retained in fixed relationship with member 100 and plate 96 by lower retaining ring 112. A series of annularly spaced bolts 117 extend through holes 118 in the lower retaining ring and threadedly secure it to the member 100.

Mounted on top of plate 73 for sliding movement transversely of the molding mechanism is a charge carrier slide 122. The slide 122 has an inverted hollow top 124. Bottom 126 is recessed at 128 to provide a charge carrying recess and also form the mold bottom. A hollow 130 within the slide consequently remains for the circulation of steam. A brace 132 separates the top and bottom. The recess 128 forms the bottom of the mold cavity in the manner shown but it will be understood that the bottom of the slide could be flush with the plate 73. In that instance a separate charging means could be employed. Also, the core bottom 30 would not extend as far into the mold cavity as is shown in FIGURE 3. A guide 134 fits over the charging slide 122 to retain the slide in a fixed path as it traverses the top of the molding cavity in receiving its charge and depositing it.

In FIGURE 4 is shown a charge carrier slide which might be utilized in a modification of this invention. This modification is concerned with an alternate charging method and includes a charge delivery port 129 and a separate mold bottom recess shown at 135.

The use, operation, and function of this invention is as follows:

When a cup having a wall thickness of approximately .030 to .040 inch is desired for use in automatic vending machines, for example, a mold core head and cavity element are designed so that in the closed relationship, as shown in FIGURE 3, a gap of that nature is left between the mold core surface and the cavity wall.

To properly fill the mold cavity, however, using pre-foamed beads of .060 inch in diameter, for example, the distance between the surface and the wall must be in the vicinity of .090 to .100 inch or greater. To establish this distance the mold core head is backed off a pre-determined distance depending upon the previously established taper of the core and cavity walls. In the case of a 9° taper, as has been set out here as an example, a vertical displacement of .525 inch must be established to insure a cavity width of .100 inch. This displacement is created by actuating the stand-off ring 50 to force the mold core head downwardly. Since the area of piston 51 is considerably greater than that of the piston in the conventional clamping cylinder, the mold core head will be forced downwardly against the bias of the clamping cylinder. A compression of approximately .060 inch is now possible before the fully closed position shown in FIGURE 3 is attained, by raising the mold core.

When this setting has been established, the cage 64 on the piston seats snugly against the flange 92 of the shell 88. The stand-off ring thus forms a cage for the prefoamed beads deposited in the mod cavity, as is shown in FIGURE 2. It will be understood that the stand-off ring 50 could be spring loaded rather than fluid operated and, consequently, remain in its raised position regardless of the pre-established vertical setting of the mold core. In such a case a conventional double position clamping cylinder would be employed to establish this vertical setting.

After the stand-off distance is established, the charging slide 128 is moved rearwardly and a metered charge of pre-foamed plastic beads is received in the cavity 128. The slide moves forwardly then, as seen in FIGURE 1, and establishes itself in the position shown in FIGURES 1–3 over the molding cavity wherein the pre-foamed beads fall by gravity, in this case, into the molding cavity. As can readily be seen, the upper surface of the bottom 30 of the mold core is convex in cross-section. This allows the beads to easily roll off the top of the bottom of the mold core 30 and evenly distribute in the cavity between the core wall 28 and cavity wall 89.

The stand-off ring in its raised position forms a cage, as hereinbefore been set out, and after the charge has been made the molding mechanism looks as is shown generally in FIGURE 2. It will be seen that the beads do not fill the whole cavity, in fact, they do not extend above the side walls 28 of the mold core.

As an alternative to this charging method, a demand feed method productive of satisfactory results might be utilized. This method is illustrated in FIGURE 4 and involves charging the mold cavity with sufficient beads to more than fill it and scraping the excess off flush with the bottom 30 of the cavity. As a result of following this procedure, a supply of beads remains around the side walls of the cavity but doesn't cover the bottom. This method has been found to produce cups of substantially uniform weight. As will be seen, a separate recess 135 forms the bottom of the cup in this instance.

After the charging has taken place, live steam is routed through conduit 106 into the passage 94 surrounding the outer wall 89 of the molding cavity. Simultaneously, steam passes into the cavity inside the molding core through the port 16 and into the cavity 130 in the charging slide. The steam immediately begins to purge out residual water in the cavity and heat the walls of the mold cavity in the mold core.

Simultaneously with this heating process, the mold core element is moved upwardly by the conventional clamping cylinder means on the framework against the bias of the stand-off ring 50. In the event that a fluid pressure operated stand-off is employed, as shown in FIGURE 1, the ports 20 and 22 are allowed to bleed fluid as the molding head moves upwardly.

As the maximum bead foaming temperature is reached, the beads expand to fill the entire cavity. The cavity and core walls have moved together to a minimum spacing of .030 to .040 inch simultaneously with the expansion of the now fully foamed beads. After reaching the final molding position as seen in FIGURE 3, heating ceases and the molded cup hardens in the cavity.

To remove the molded cup, the core element may be forced downwardly relative to the cavity wall by lowering the core head through the conventional air pressure means or in the case where a fluid pressure operated stand-off ring is utilized actuating the fluid pressure stand-off ring to force the core downward. The core can then be sufficiently lowered to allow conventional means such as a blast of air pressure or the like to remove the molded cup.

It will be readily understood that any amount of stand-off and thus compression may be obtained by pre-setting the vertical displacement of the mold core head as a function of the taper of the walls of the core and cavity. The final thickness of the cup wall is then dictated by the construction of the core head and cavity element in their fully seated relationship, as shown in FIGURE 3. Cups having a wall thickness of .030 to .040 inch for use in automatic vending machines may easily be made. Cups having intermediate thicknesses of .060 or .070 inch, for example, are similarly easily manufactured, as are even thicker walled articles, by merely changing the core head and cavity element.

Containers having a wide range of wall thicknesses may be easily and rapidly manufactured by this method. The thickness of the walls, whether in the neighborhood of .030 inch or of medium thickness such as .060 inch, may be considerably less than the wall thicknesses of .100 inch or the like heretofore found in this type of plastic cups. The walls are consequently resilient and far less brittle than their thick-walled counterparts. The result is that they do not shatter as easily when they are broken.

Since cups having wall thicknesses in the neighborhood of .030 inch can easily be manufactured by this method, more than double the number can be stacked in a fixed space. This permits their use in automatic vending equipment and halves the packing materials such as tubes and boxes required in shipment. In conjunction with this, a saving in freight is realized as these cups are ordinarily shipped on a bulk factor basis.

Beads having a density as low as 2.5 lbs./ft.$^3$ can be used in this process, a opposed to beads of a substantially higher density which formerly were required.

Since thinner walled cups result from practicing this method, expansion of the pre-foamed beads in the molding cavity to the extent formerly required is not necessary. Thus, pre-foamed plastic beads can be stored on the shelf for periods of a month and more and still be satisfactory for use in this process.

This method might also be used, however, in the manufacture of containers having relatively thick walls. In such case the compression would be utilized primarily to eliminate any voids in the walls of the container.

By using a metered charge of pre-foamed plastic beads, charge weight is uniform and uniformity of cup weight may be maintained.

Additionally, it will be readily seen that many varied articles formed of expanded polystyrene or the like might be manufactured using these methods.

Accordingly, it is intended that the foregoing explanation be illustrative only and not definitive and that the invention be limited only by the appended claim.

I claim:

A method of molding a foam plastic article having at least one quite thin wall section from individual pre-foamed plastic beads having a given mean diameter, including the steps of defining a molding cavity having the shape of the desired article with a volume and size somewhat greater than the volume and size of the desired article by positioning wall surfaces spaced from each other by a distance substantially greater than the mean diameter of the pre-foamed plastic beads, charging the thus defined somewhat larger cavity with pre-foamed plastic beads, thereafter heating the cavity to an elevated temperature to additionally foam the beads so that they fuse together into a rigid article and, approximately at the same time as the heating step, reducing the volume of the thus defined cavity by moving at least one of the wall surfaces toward the other to a distance substantially less than the mean diameter of the prefoamed plastic beads, and discontinuing this movement of the wall surfaces when the volume and size of the molding cavity has been reduced to the volume and size of the desired article to thereby compress the beads at approximately the same time that they are being formed into the desired article by the heating step.

References Cited by the Examiner

UNITED STATES PATENTS

| 1,624,904 | 4/27 | Claus | 18—16.7 |
| 2,224,852 | 12/40 | Lowry | 18—55 |

(Other references on following page)

UNITED STATES PATENTS

| | | | |
|---|---|---|---|
| 2,232,180 | 2/41 | Kux | 18—16.7 |
| 2,411,379 | 11/46 | Langhammer | 18—16.7 |
| 2,449,008 | 9/48 | Pecker et al. | 18—16.7 |
| 2,525,965 | 10/50 | Smith | 18—48 X |
| 2,608,826 | 9/52 | Haller | 18—16.7 |
| 2,779,062 | 1/57 | Stastny | 18—48 |
| 2,787,809 | 4/57 | Stastny | 18—48 |
| 2,789,332 | 4/57 | Scott | 18—16 |
| 2,860,378 | 11/58 | Urchick | 18—48 |
| 2,899,708 | 8/59 | Donaldson | 18—48 |
| 2,907,072 | 10/59 | Jodell | 18—48 |
| 2,951,260 | 9/60 | Harrison et al. | 18—48 |
| 2,979,770 | 4/61 | Greene et al. | 18—16.7 |
| 3,030,668 | 4/62 | Taylor | 18—48 |

FOREIGN PATENTS 781,046   8/57   Great Britain.

OTHER REFERENCES

Pages 452–455, July 1956, "Plastics Technology, Fabrication Methods for Expandable Polystyrene," vol. 2, No. 7.

Pages 3, 14, 15 and 19 (1954) "Dylite-Expandable-Polystyrene," Koppers booklet.

ALEXANDER H. BRODMERKEL, *Primary Examiner.*

MICHAEL V. BRINDISI, WILLIAM J. STEPHENSON, MORRIS LIEBMAN, *Examiners.*